Figure 1:
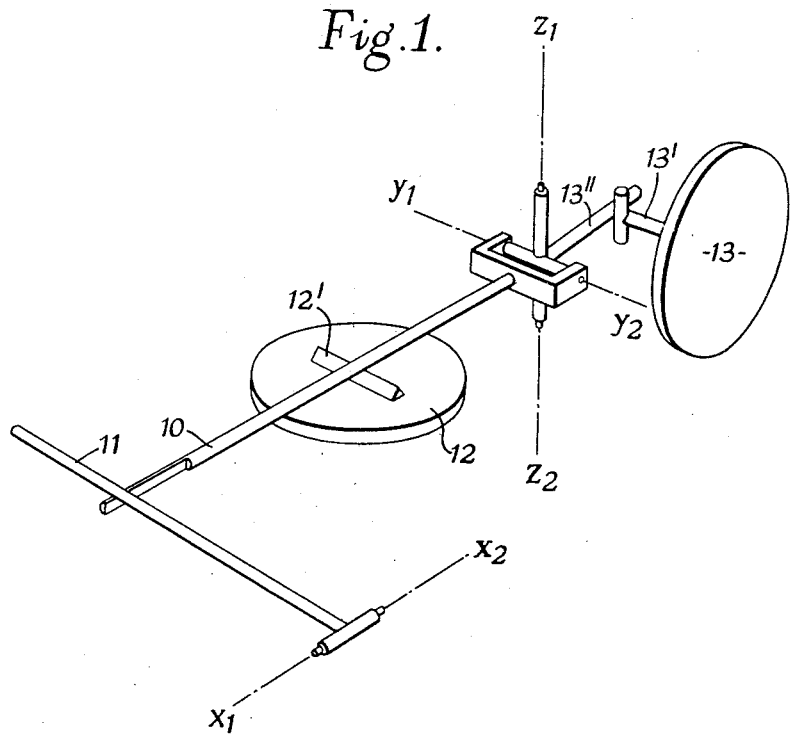

March 5, 1957  L. J. STREET  2,783,650
MULTIPLYING AND DIVIDING MECHANISMS
Filed July 1, 1953  6 Sheets-Sheet 1

INVENTOR
L. J. STREET
BY
ATTORNEYS

March 5, 1957

L. J. STREET 2,783,650

MULTIPLYING AND DIVIDING MECHANISMS

Filed July 1, 1953

6 Sheets-Sheet 2

INVENTOR
L. J. STREET
BY
Moore & Hall
ATTORNEYS

March 5, 1957  L. J. STREET  2,783,650
MULTIPLYING AND DIVIDING MECHANISMS
Filed July 1, 1953  6 Sheets-Sheet 4

INVENTOR
L. J. STREET
BY
Moore & Hall
ATTORNEYS

March 5, 1957　　　L. J. STREET　　　2,783,650
MULTIPLYING AND DIVIDING MECHANISMS
Filed July 1, 1953　　　　　　　　　　　　　　6 Sheets-Sheet 5

INVENTOR
L. J. STREET
BY
Moore & Hall
ATTORNEYS

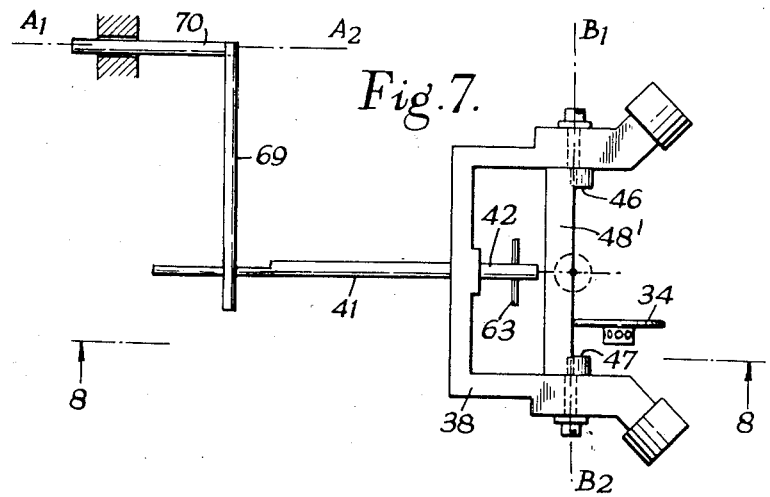
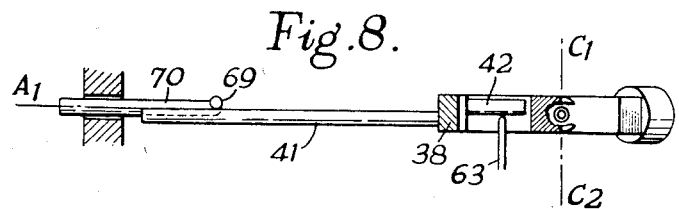
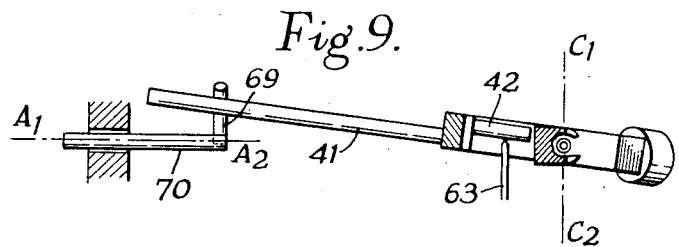
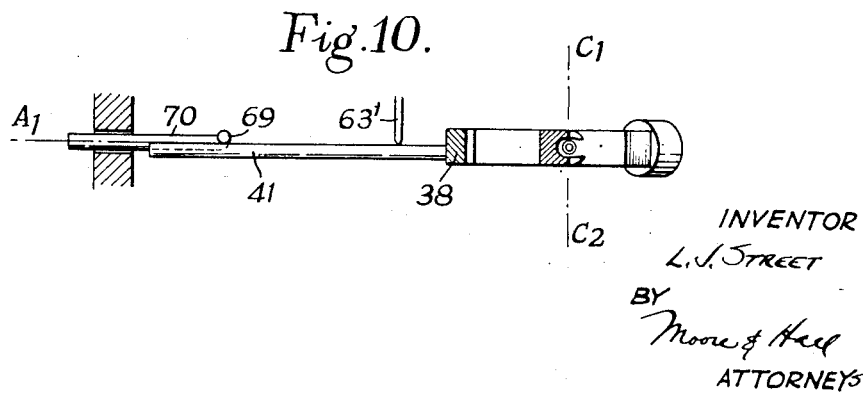

United States Patent Office 2,783,650
Patented Mar. 5, 1957

2,783,650

MULTIPLYING AND DIVIDING MECHANISMS

Leslie John Street, Basingstoke, England, assignor to Kelvin & Hughes Limited, Glasgow, Scotland Application July 1, 1953, Serial No. 365,514

Claims priority, application Great Britain July 7, 1952

4 Claims. (Cl. 74—1)

The present invention relates to mechanisms suitable for multiplying and dividing two magnitudes, one by the other, represented by displacements of two actuating members respectively.

Important applications of such mechanisms lie in the provision of maximum safe air speed indicators, true air speed indicators, and Mach number indicators, the latter being indicators for indicating the ratio of true air speed to the speed of sound in the air in which an aircraft is flying.

In such indicators two pressure capsules are usually provided, one giving rise to movements representative of changes in static atmospheric pressure and the other giving rise to movements representative of changes in the difference between the static pressure and the pitot pressure.

These two movements are compounded to produce a movement of, say, an indicator pointer, this pointer co-operating with a scale calibrated appropriately.

A known indicator for achieving this purpose employs a system of levers which include one or more members mounted for both axial sliding movement and rotational movement, and usually spring restraints are associated with the two pressure capsules in order to facilitate calibration.

One object of the present invention is to provide improved mechanism suitable for use in multiplying and dividing two magnitudes, one by the other, by means of levers mounted for rotational movement only.

Another object of the present invention is to provide improved dividing mechanism suitable for use in maximum safe air speed indicators, true air speed indicators, and Mach number indicators, and such that no members need be mounted for both axial sliding movement and rotating movement and that linear pressure capsules may be employed whereby spring restraints need not be used and hence calibration and design are facilitated.

According to the present invention, mechanism suitable for multiplying and dividing two magnitudes, one by the other, represented by displacements of two actuating members respectively, comprises a system of levers including a first lever mounted for rotation about two mutually perpendicular axes, and, in contact with the first lever, a second lever mounted for rotation about a third axis, the system of levers being adapted to couple the two actuating members to an output member in such a manner that the output member is displaced by the system of levers in response to displacement of the actuating members, and the displacement of the output member is fixedly related to the product or quotient of the magnitudes represented by the displacements of the actuating members. Any or all of the said displacements may be angular displacements or linear displacements.

In a preferred form of the invention suitable for use in dividing the two magnitudes one by the other, a first of the actuating members is adapted to produce rotation of the first lever about a first of the said two mutually perpendicular axes, the second actuating member is adapted to produce rotation of the first lever about the second of the said mutually perpendicular axes, and the second lever is adapted to actuate the output member. It is preferred to arrange that the third axis is also perpendicular to the first axis and lies in a plane also containing the second axis.

This preferred form of the invention is suitable for incorporation in a Mach number indicator in which the displacement of the first actuating member is effected by a pressure capsule subjected to static atmospheric pressure and the displacement of the second actuating member is effected by a pressure capsule subjected to the difference between static atmospheric pressure and pitot pressure. By arranging that the displacements of the two actuating members are rectilinear and take place respectively at right angles and parallel to the first axis the pressure capsules can be linear pressure capsules whereby the design and calibration of the Mach number indicator are facilitated and a high degree of accuracy is obtainable. A linear pressure capsule is one whose output movements over its normal working range are substantially directly proportional to the pressure to which the capsule is subjected.

In order to multiply the two magnitudes, one by the other, one of the actuating members may be adapted to produce rotation of the second lever about the third axis, and the second actuating member to produce rotation of the first lever about one of the said two mutually perpendicular axes. The output member is then adapted for displacement in response to rotation of the first lever about the other of the said two mutually perpendicular axes.

The invention will now be described by way of example with reference to the accompanying drawings in which—

Figure 2:
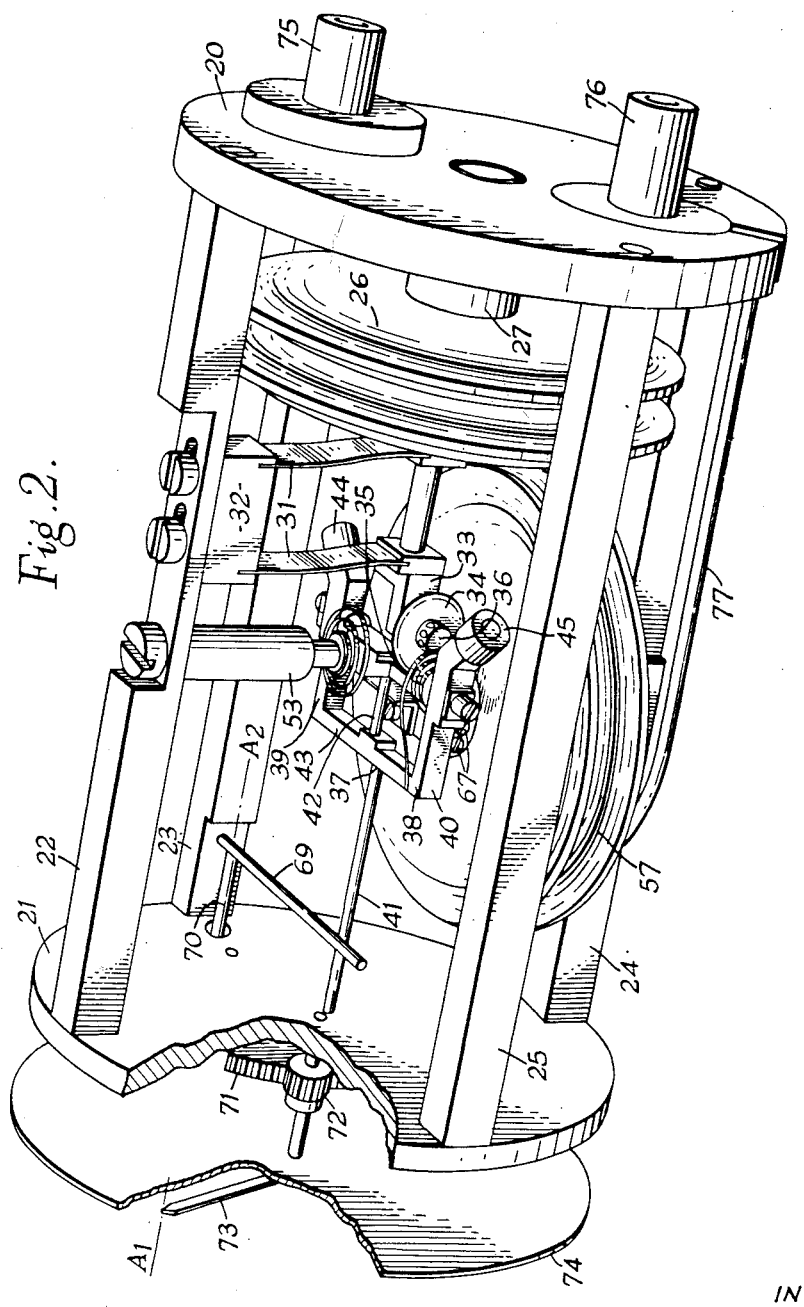
Figure 3:
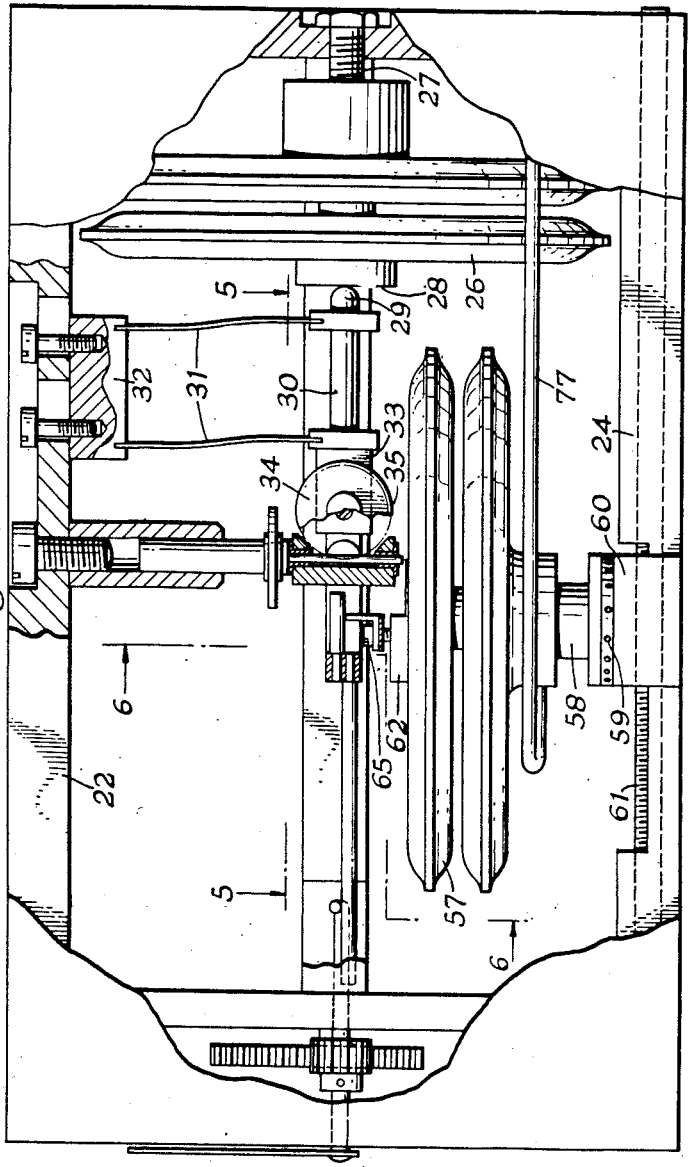
Figure 4:
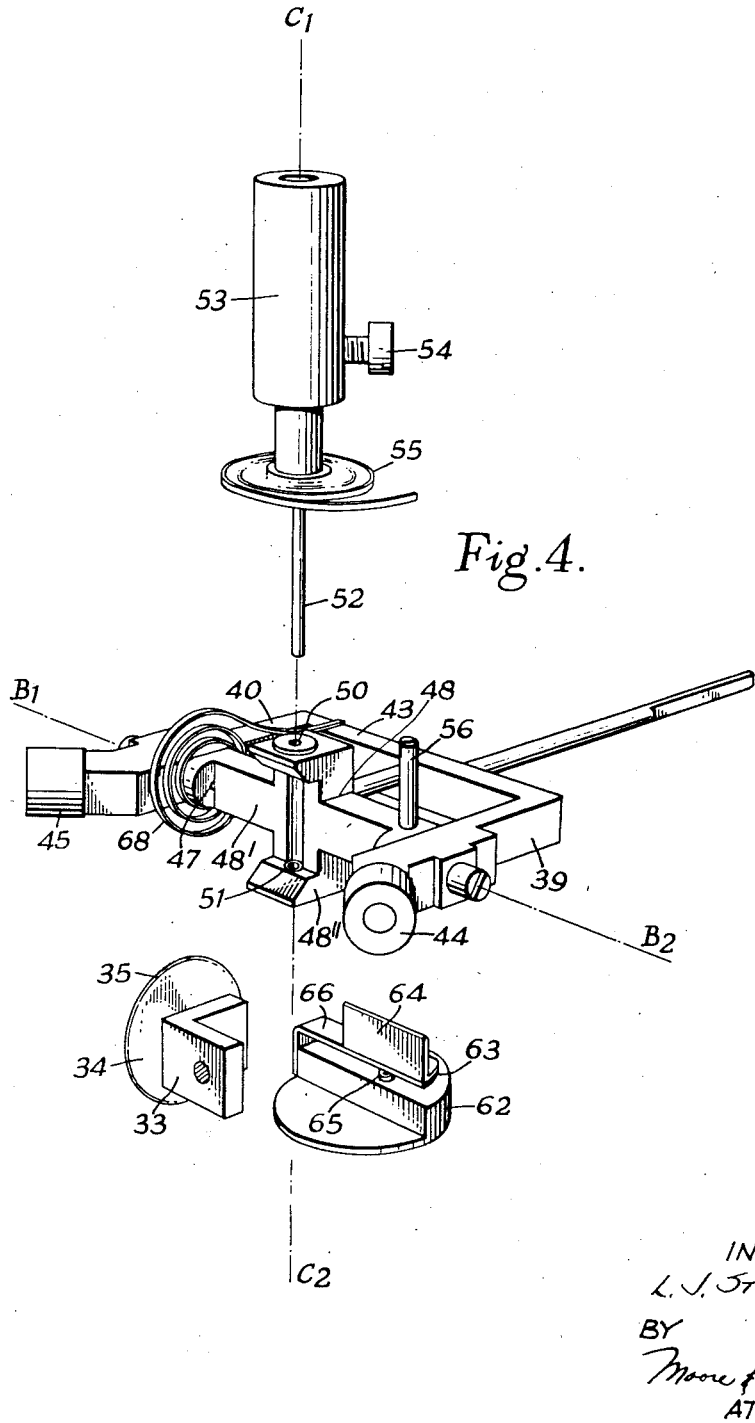
Figure 5:
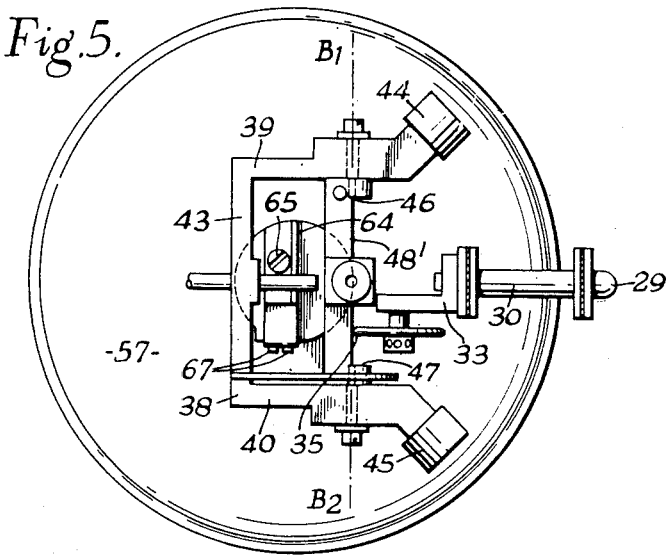
Figure 6:
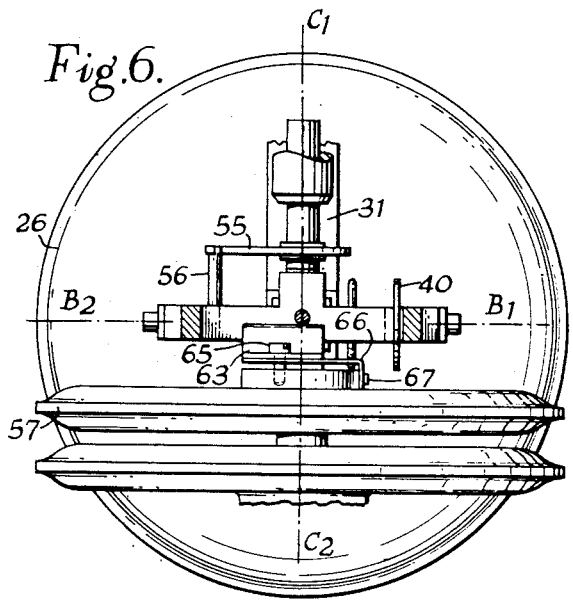

Figure 1 shows dividing mechanism suitable for use in a Mach number indicator,

Figure 2 is a perspective view of a Mach number indicator embodying the present invention, Figure 3 is a part-sectional side elevation of the indicator of Figure 2, Figure 4 is an exploded view, on an enlarged scale, of a part of the arrangement of Figure 2, Figure 5 is a view taken from 5—5 of Figure 3, Figure 6 is a view taken from 6—6 of Figure 3, Figure 7 is a plan view of a system of levers in the arrangement of Figures 2 and 3, Figure 8 is an elevation view taken from 8—8 of Figure 7, Figure 9 is an elevation view of the arrangement of Figures 7 and 8 showing one of the levers rotated through a small angle, Figure 10 shows a modified arrangement of the levers and actuating members of Figures 7–9.

In Figure 1, a first lever 10 is mounted for rotation about an axis $z_1$, $z_2$, which is fixed relatively to a frame (not shown). The lever 10 is also mounted for rotation about a second axis $y_1$, $y_2$, which in turn rotates about the axis $z_1$, $z_2$, with rotation of the lever 10 about the axis $z_1$, $z_2$. The lever 10 bears upon a second lever 11 which is mounted for rotation about a third axis $x_1$, $x_2$ fixed relatively to the frame. In the arrangement shown in Figure 1 the axes $z_1$, $z_2$, and $y_1$, $y_2$ intersect one another and are at right angles to one another and the axis $x_1$, $x_2$ lies in the same plane as the axis $y_1$, $y_2$. A pressure capsule 13 is mounted so as to produce movements of a member 13′ in a direction at right angles to the axis $z_1$, $z_2$. Movement of the member 13′ effects a movement of a member 13″ which in turn effects a swivelling movement of the axis $y_1$, $y_2$, about axis $z_1$, $z_2$. A second pressure capsule 12 is arranged below the lever 10 and is adapted to produce movements of a member 12′ in a direction parallel to the axis $z_1$, $z_2$. Movement of the member 12′ which bears against the lever 10, effects rotational movement of the lever 10 about the axis $y_1$, $y_2$. It can be shown that the movement of the lever 11 arising from the movement of the lever 10 under the control of the capsules 12 and 13 is such that the equation $a/b = k \tan \theta$ is met where $a$ represents the movement of the output member 12', $b$ represents the movement of the member 13', $k$ is a constant and $\theta$ is the angle through which the lever 11 is rotated.

In providing a Mach number indicator the mechanism must be such that the quotient of (i) the difference between the pitot and static pressure and (ii) the static pressure is a function of the Mach number. It will be seen that the rotation of the lever 11 in Figure 1 will meet this requirement if the pressure capsule 12 produces movements of the member 12' representative of the difference between the pitot pressure P and the static pressure S, the pressure capsule 13 produces movements of the member 13' representative of changes in static pressure, and the pressure capsules 12 and 13 are linear pressure capsules. No axial sliding movements of the levers 10 and 11 take place.

Figures 2-6 show a practical form of Mach number indicator embodying the invention in which there is provided a circular back plate 20 and a circular front plate 21 connected in parallel relationship by means of four pillars 22, 23, 24, 25 to form a frame. A capsule 26, corresponding to the capsule 13 shown in Figure 1, is fixed with its axis parallel to the longitudinal axis of the frame on a threaded mount 27 screwed into the back plate 20 and is thus adapted for adjustment in the direction of the longitudinal axis of the frame. A flat polished stainless steel face 28 is secured to the front of the capsule 26. This flat face 28 bears against the hemispherical end 29 of a push rod 30 maintained parallel to the longitudinal axis of the frame by means of two flat springs 31 secured one at each end of the push rod and positioned parallel to each other and secured to a block 32 screwed to the pillar 22. The front end of the push rod terminates in an angle piece 33 which is bored and tapped to receive the screw-threaded shank of an adjusting screw 34 for adjusting the sensitivity of the indicator to movements produced by the capsule 26, the said shank being positioned horizontally and at right angles to the longitudinal axis of the push rod. The adjusting screw is provided with a large diameter head, the edge 35 of which has a very small radius, and with a centre stub 36 apertured for the reception of a tommy bar. The head of the adjustment screw 34 corresponds to the first actuating member 13' of Figure 1.

A lever 37, corresponding to the lever 10 of Figure 1, comprises a U bracket 38, the arms 39, 40 of which lie in a plane at right angles to the vertical longitudinal plane of the frame, a cross member 43, and two rods 41 and 42 respectively secured one on either side of the cross piece 43 of the U bracket 38. Two balance weights 44, 45 are fitted, one on each of the free ends of the arms 39 and 40 respectively. On the arms 39 and 40 respectively, intermediate the cross piece 43 and the balance weights 44, 45, there are provided two spindles adapted for rotation about a horizontal axis $B_1$, $B_2$ (corresponding to $y_1$, $y_2$ in Figure 1) in two horizontal jewelled bearings 46, 47. The bearings are located one at each end of a horizontal arm 48' of the cross member 48. The centre portion of the rear face of this horizontal arm 48' is cut back to the centre line of the two jewelled bearings 46, 47 and is polished in order to provide a smooth contact surface for the edge 35 of the sensitivity adjusting screw 34 for the capsule 26. The centre portion of the rear face of a vertical arm 48'' of the said cross member 48 is cut back beyond the centre line of the horizontal jewelled bearings 46, 47. The end portions of this vertical arm are provided with vertical jewelled bearings 50, 51 such that the centre line of the vertical bearings 50, 51 intersects the centre line of the horizontal bearings 46, 47. The said vertical bearings 50, 51 are adapted for engagement with a vertical spindle 52 located in an aperture in a holder 53 secured to the pillar 22 of the frame, the said spindle 52 being held in position by the tip of a screw 54 in the holder 53 and projecting into the said aperture. The horizontal arm 48' is biased in an anticlockwise direction around the vertical spindle 52, as viewed from the top of the frame, by means of a hairspring 55. One end of the hairspring 55 is secured to the holder 53 of the vertical spindle 52 and the other end of the hairspring is secured to a fixture 56 on the left-hand portion of the horizontal arm 48' (as viewed from the front of the frame). Thus the right hand rear face of the said horizontal arm 48' is held in contact with the edge 35 of the sensitivity adjusting screw 34 for the capsule 26. The axis $C_1$, $C_2$ corresponds to the axis $z_1$, $z_2$ of Figure 1.

A capsule 57, corresponding to the capsule 12 in Figure 1, is fixed to a mount 58 which is provided with a screw threaded shank adapted to engage a screw ring 59 located on a block 60 slidably mounted in an aperture in the pillar 24. The vertical position of the capsule 57 is adjusted by means of the screw ring 59, and the longitudinal position thereof with respect to the frame is adjusted by means of a lead screw 61 engaging with a screw threaded aperture in the block 60. The top surface of the capsule 59 is provided with an abutment 62 on to which is mounted a spring loaded right-angled plate 63 having one flat positioned in a lateral vertical plane. The plate 63 corresponds to the second actuating member 12' of Figure 1. The top horizontal edge 64 of the vertical flat has a very small radius and is adjusted for tilt in the said lateral vertical plane by a screw 65 depressing the horizontal flat of the plate against a spring 66 secured to the abutment 62 by means of two screws 67. A small coiled spring 68 is secured to one end of the aforesaid horizontal arm 48' and bears against the cross piece 43 of the U bracket 38, biasing the lever 37 downwards and holding the rearwardly positioned rod 42 of the lever 37 against the top edge 64 of the plate 63. A rod 69, corresponding to the second lever 11 of Figure 1, rests upon the front rod 41 of the lever 37 and is mounted on a spindle 70 for pivoting about an axis $A_1$, $A_2$ (corresponding to the axis $x_1$, $x_2$ of Figure 1). To this spindle 70 is secured a geared sector 71 located in front of the front plate 21. The geared sector 71 is in mesh with a gear pinion 72 to the spindle of which is attached the indicator pointer 73. A Mach number dial 74 is located between the pointer 73 and the gear pinion 72.

Two pressure tube connections 75, 76 are located in the back plate 20, the connection 75 communicating with the interior of the frame and providing static pressure, and the connection 76 communicating via the tube 77 with the capsule 57 and being connected to a pitot head (not shown) providing pitot pressure.

The rods 41, 42 and 69 are all circular rods of small diameter, about 2 mm. The thickness of the rods introduces errors in the operation of the mechanism but the diameter of the rods cannot be reduced below that necessary to give them the required strength and stiffness. In order to increase the degree of accuracy to which the equation $(P-S)/S = k \tan \theta$ is met by the mechanism, the rods 41 and 69 are offset by an amount equal to their radius in directions such that the point of contact between the rods 41 and 69 over the operating range is at any instant substantially in the line of intersection of two planes which contain the axes $B_1$, $B_2$, and $A_1$, $A_2$ respectively and which rotate about these axes with rotation of the rods 41 and 69 respectively about these axes.

In order to obviate an error in the operation of the mechanism due to the thickness of the rod 42, the rod 42 is offset by an amount equal to its radius in a direction such that the locus of the point of contact between the rod 42 and the plate 63, over the operating range of the mechanism, always lies in the aforesaid plane containing the axis B₁, B₂ and rotating with the rod 42 about the said axis B₁, B₂.

The accuracy of the indicator described is not affected by the engagement of the first actuating member, that is the head of the adjustment screw 34, with the lever 37 since the centre portion of the rear face of the horizontal arm 48' is cut back to the centre line of the two horizontal jewelled bearings 46, 47, and the centre line of the two vertical jewelled bearings 50, 51, that is to say to a plane containing the axes B₁, B₂ and C₁, C₂. The locus of the point of contact between the head of the adjustment screw 34 and the horizontal arm 48', over the operating range of the mechanism, therefore lies in the plane containing the axis C₁, C₂ and rotating with the horizontal arm 48' about the axis C₁, C₂.

The offsetting of the rods 41, 42 and 69 and the position of the rear face of the horizontal arm 48', relative to the axis C₁, C₂, are illustrated in Figures 5 and 7–9. The axes A₁, A₂, and B₁, B₂ lie in the same horizontal plane. Figure 8 shows the mechanism in a position in which rods 69, 41 and 42 are all horizontal.

With the mechanism set as shown in Figure 8 the rod 69 which is secured to the spindle 70 is offset vertically upwards from the horizontal plane containing the axis A₁, A₂ by an amount equal to the radius of the rod 69 whereby the lower edge of the said rod 69 as seen in Figure 8 lies in the horizontal plane passing through the axis A₁, A₂. The rod 41 which is secured to the U bracket 38 is offset vertically downwards from the horizontal plane containing the axis B₁, B₂ by an amount equal to the radius of the rod 41, whereby the upper edge of the rod 41 as seen in Figure 8 lies in the horizontal plane containing the axis B₁, B₂. The rod 42 which is secured to the U bracket 38 is offset vertically upwards from the plane containing the axis B₁, B₂ by an amount equal to the radius of the rod 42, whereby the lower edge of the said rod 42 as seen in Figure 8 also lies in the plane containing the axis B₁, B₂.

It will be seen that, in the position of operation of the mechanism shown in Figure 8, the axis A₁, A₂, the point of contact between the rods 69 and 41, the point of contact between the rod 42 and the plate 63, and the axis B₁, B₂ all lie in one plane. In the position of the mechanism shown in Figure 9 the point of contact between the rods 69 and 41 lies substantially in the line of intersection of two planes, one plane containing the axis A₁, A₂, and rotating about the axis A₁, A₂ with rotation of the rod 69 about the said axis A₁, A₂, and the other plane containing the axis B₁, B₂ and rotating about the axis B₁, B₂ with rotation of the rod 41 about the said axis B₁, B₂. There is, of course, only one position of the rods 41 and 69 in which their point of contact with one another lies exactly in the line of intersection of the two planes. By making the rods sufficiently thin, however, for all practical purposes the point of contact is always in the line of intersection of the two planes. The point of contact between the rod 42 and the plate 63 always lies along the said plane containing the axis B₁, B₂, and rotating about the axis B₁, B₂, with rotation of the rod 42 about the said axis B₁, B₂.

Although, in the preferred embodiment of the invention, the first lever, that is lever 37, comprises two rods 41 and 42 positioned in the same vertical plane and parallel to one another but having their axes spaced apart by an amount equal to the sum of their radius as previously described, the provision of the rod 42 is not essential. Figure 10 shows an arrangement in which a plate 63' acts directly on to the rod 41 and acts upon that side of the rod 41 which bears against the rod 69. As seen in this figure the rod 41 is offset vertically downwards by an amount equal to its radius and hence the point of contact between the plate 63' and the rod 41 lies in the plane containing the axis B₁, B₂, and rotating about the axis B₁, B₂ with rotation of the rod 41 about the axis B₁, B₂.

The rod 69 is offset in the same manner as described with reference to Figure 8. Thus the point of contact between the rods 41 and 69 of Figure 10 is the same as in Figures 8 and 9.

It will be appreciated that the rod 42 of Figure 8 is offset in the direction in which force is applied to the rod 42 by the member 63; the rod 41 is offset in the opposite direction to the rod 42; and that the rod 69 is offset in the direction in which force is applied thereto from the rod 41.

The Mach number indicator described above is easily calibrated as it is necessary merely to calibrate at one Mach number at two altitudes for the instrument to indicate correctly for all Mach numbers over the full altitude range. During assembly of the instrument the top horizontal edge 64 of the plate 63 bearing against the rod 42 is adjusted for tilt in the vertical plane so that the said edge 64 lies parallel to the axis B₁, B₂. With the P–S pressure at zero, the vertical adjustment of the P–S capsule 57 is then set by means of the screw ring 59 so that rotation of the lever 37 about the axis C₁, C₂ causes no change in the pointer reading which is previously set at zero. This presetting of the instrument ensures that at zero Mach number the axes A₁, A₂ and B₁, B₂, the top horizontal edge 64 of the plate 63 and the point of contact between the lever 69 and the rod 41 all lie in a common plane. The appropriate static and pitot pressures for a certain Mach number are applied to the instrument and the sensitivity of the P–S capsule 57 is adjusted by the lead screw 61 so that the correct Mach number is indicated by the pointer 73. This adjustment can conveniently be made with the static pressure at the prevailing ground level pressure. The appropriate pressures for the same Mach number at some other altitude are then applied to the instrument and the sensitivity adjustment screw 34 of the S capsule 26 adjusted so that the point 73 again indicates the correct Mach number. Except in the particular case of the initial setting being made with the lever 37 and the lever 69 at right angles to each other, it will be found necessary to reset the P–S capsule sensitivity at both altitudes when the S capsule adjustment is made.

Whilst one particular embodiment of the mechanism according to the invention has been described, it will be understood that various modifications which will be apparent to those skilled in the art may be made. For example in the embodiment described the output in terms of Mach number is not linear. If linearity is required on the dial presentation a suitable linkage, cam mechanism, or shaped sector may be introduced between the lever 69 and the pointer 73.

Furthermore the invention may be applied to apparatus other than Mach number indicators, and will serve to divide any two magnitudes (one by the other) represented by the movements of the two actuating members from whatever cause. It will be appreciated that if in the equation $a/b = k \tan \theta$ $b$ is equal to the reciprocal of a number the value of $k \tan \theta$ represents the product of this number and $a$ whereby the mechanism may be employed for the purpose of multiplying two magnitudes.

This indirect method of obtaining the product of the two magnitudes is, however, not necessary since, by suitable modification, the arrangement of Figure 1 can be arranged to function direct as a multiplying device. For example if the member 13' is arranged to cause rotation of the lever 11 instead of 10, and the member 12' is rotated through 90° so as to act in the direction of the axis y₁, y₂, proceeding from the reference y₂ to the reference y₁, an output member coupled to indicate rotation of the lever 10 about the axis y₁, y₂ would indicate the product of the magnitudes represented by the movements of the members 13' and 12'.

The end of the rod 10 of Figure 1 may be shaped as shown to increase still further the accuracy of the mechanism.

I claim:

1. In combination, a mechanism for multiplying and dividing two magnitudes, one by the other, represented by displacements of two actuating members respectively, a system of levers comprising a first rod mounted for rotation about two mutually perpendicular axes and a second rod mounted for rotation about a third axis and in sliding point contact with said first rod, an output member coupled to said two actuating members by said system of levers so that said output member is displaced thereby in response to displacement of at least one of said actuating members, said displacement of said output member is fixedly related to one of two factors comprising the product and quotient of the magnitudes represented by the displacements of the actuating members, said rods being so positioned and mounted that the locus of their point of sliding contact lies in a first plane containing a first of said two mutually perpendicular axes, said first plane being rotatable about said first axis as said first rod rotates thereabout, said locus also lying in a second plane containing said third axis, said second plane being rotatable about said third axis as said second rod rotates thereabout, said rods having thereon respective contact lines along which the sliding point of contact moves, each said line of contact lying in its respective plane and rotating therewith.

2. The combination set forth in claim 1, said first rods being offset so that the lines of point contact thereon passes through the intersection of said mutually perpendicular axes and is parallel to said third axis.

3. Linkage mechanism comprising a frame, a first lever mounted to rotate about a first axis in response to displacement of a first actuating member and a second lever bearing upon the first lever and mounted to rotate about a second axis in response to rotation of the first lever about the first axis, the construction and mounting of the two levers being such that a first straight line can be drawn along at least the operative contact surface of the first lever, the first straight line being such that if extended would pass through the first axis and that a second straight line can be drawn along at least the operative contact surface of the second lever, the second straight line being such that if extended would pass through the second axis, and the arrangement being such that in at least one predetermined relative position of the two levers within the operating range of the mechanism the point of contact between the two levers lies at the point of intersection of the first and second straight lines.

4. Linkage mechanism as claimed in claim 3, a second actuating member and an output member, the displacements of said actuating members representing two distinct magnitudes, characterized in that the said first lever is mounted to rotate about a third axis perpendicular to the first axis, and the system of levers are constructed to couple the two actuating members to the output member in such manner that the output member is displaced by the system of levers in response to displacement of the actuating members, and the displacement of the output member is fixedly related to the product or quotient of the magnitudes represented by the displacements of the actuating members.

References Cited in the file of this patent

UNITED STATES PATENTS

| 1,091,708 | Riddell | Mar. 31, 1914 |
| 2,177,244 | Ciamberlini | Oct. 24, 1939 |
| 2,296,714 | Ibbott | Sept. 22, 1942 |
| 2,455,329 | Cook | Nov. 22, 1943 |
| 2,399,448 | Nyquist | Apr. 30, 1946 |
| 2,476,625 | Ricordel | July 19, 1949 |
| 2,534,225 | Brown | Dec. 19, 1950 |

FOREIGN PATENTS

| 468,059 | Italy | Dec. 29, 1951 |